Figure 2:
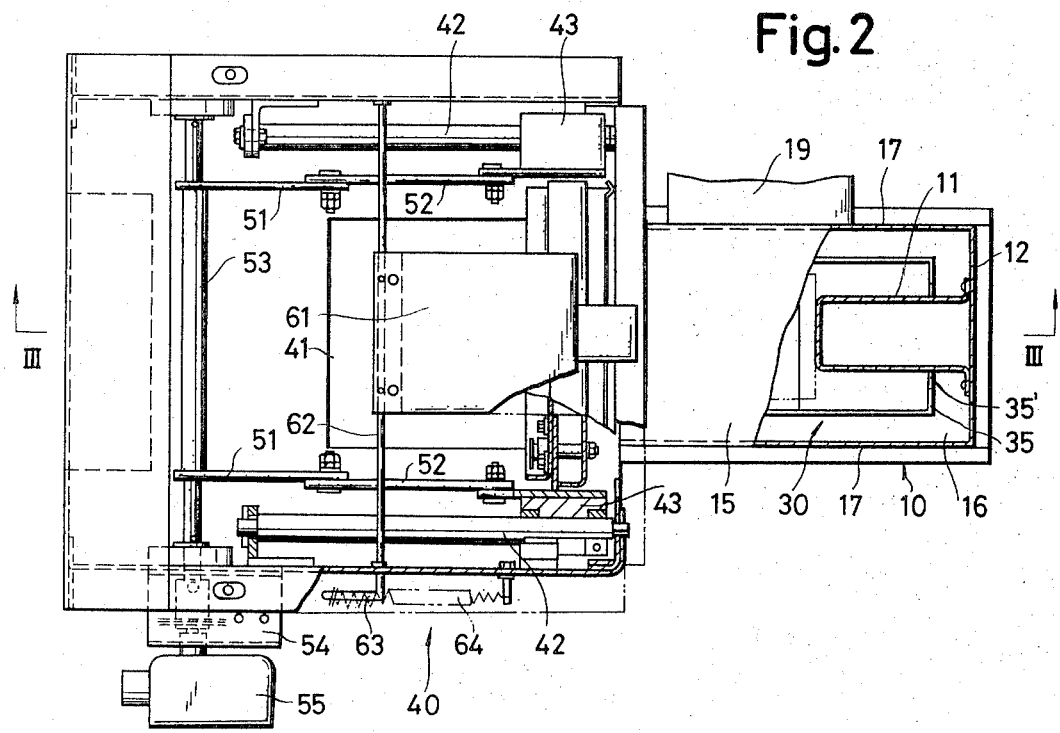

# United States Patent [19]

Naruse

[11] 3,838,790
[45] Oct. 1, 1974

[54] A HEATING AND DISPENSING DEVICE FOR FOOD ARTICLES
[75] Inventor: Nobutaka Naruse, Toyoake, Japan
[73] Assignee: Hoshizaki Denki Kabushiki Kaisha, Toyoake, Japan
[22] Filed: Nov. 24, 1972
[21] Appl. No.: 309,361

[30] Foreign Application Priority Data
Mar. 21, 1972 Japan.............................. 47-33476

[52] U.S. Cl. ............................ 221/150 HC, 99/357
[51] Int. Cl. ............................................. G07f 11/00
[58] Field of Search ........... 221/90, 150 A, 150 HC, 221/262, 248; 99/357, 327

[56] References Cited
UNITED STATES PATENTS
3,416,429 12/1968 Torsiello et al.................... 99/357 X
3,534,676 10/1970 Rubino ............................. 99/327 X
3,653,541 4/1972 Crum ............................ 221/150 HC Primary Examiner—Stanley H. Tollberg
Attorney, Agent, or Firm—Frank J. Jordan

[57] ABSTRACT

Device for feeding packed foodstuffs stacked in a storage chamber one by one to an electronic range chamber to be heated and discharging the heated foodstuff pack to a chute to a dispensing mouth. Said device essentially comprises a box fixed at the back thereof with a lid for electronically insulating the electronic range. Said box is moved between the retracted position and the forward position. When retracted, the box having open top may receive the foodstuff pack falling down from the storage chamber. When moved forward, the box containing the pack therein enters the electronic chamber which is closed with said lid during its operation. When retracted, the box having a hinged bottom wall which is now swung down as being out of support by the bottom wall of the range chamber releases the pack to fall down to the dispensing chute. Since receiving foodstuff pack from the storage chamber, feeding the pack into the electronic range and discharging the pack to the dispensing mouth are done by only one box adapted to be reciprocatingly movable together with the lid for the electronic range, the construction is simple and operations are reliable and prompt.

10 Claims, 8 Drawing Figures

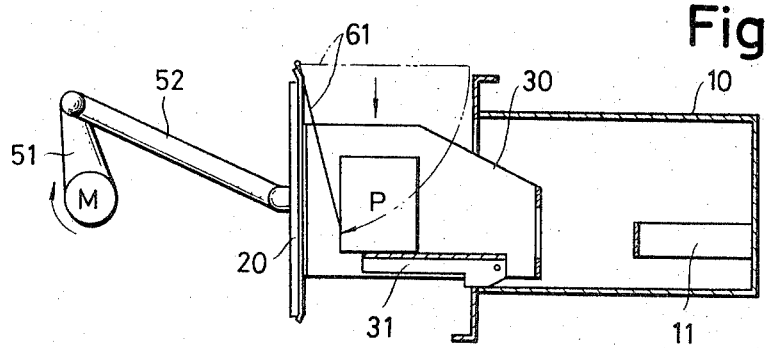
Fig.1-A
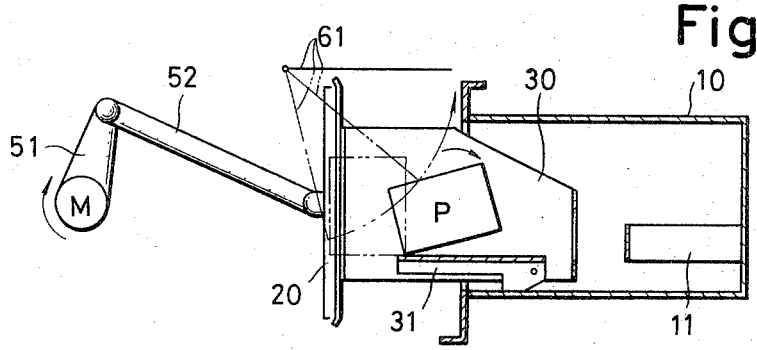
Fig.1-B
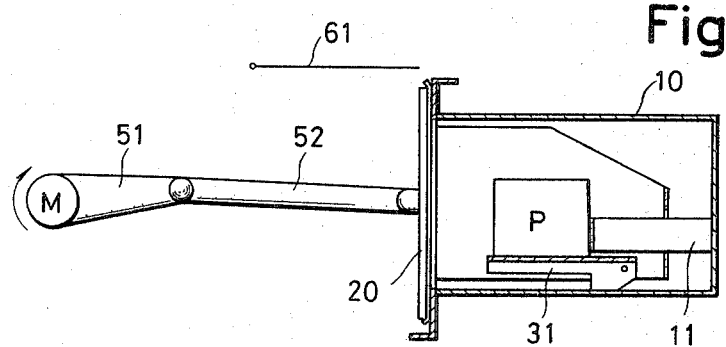
Fig.1-C
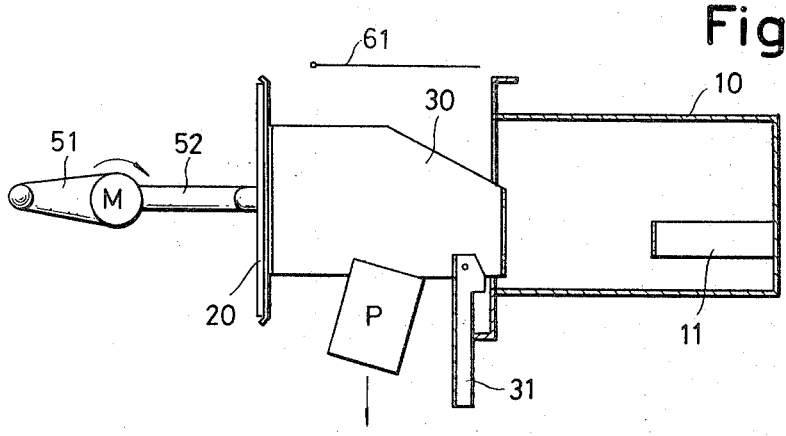
Fig.1-D

A HEATING AND DISPENSING DEVICE FOR FOOD ARTICLES

The present invention generally relates to a hot foodstuff vending machine, and more particularly to a device for feeding packed foodstuffs gathered in a storage zone one by one to a heating zone and discharging the heated foodstuff pack to a dispensing zone in such automatic vending machine.

Various automatic vending machines have been provided and actually widely utilized for a considerably long time. In view of the fact that so-called electronic oven or range in which there is provided a magnetron to generate a sort of microwave for directly affecting on the foodstuff to be heated have been commercially available, it has been recently proposed to provide a vending machine for dispensing a foodstuff such as hamburger and hotdog in hot state. In such vending machine, a plurality of foodstuff products each previously cooked and packed are to be stored preferably in the freezer or refrigerator chamber so as to be fed to the electronic oven or the heater chamber one by one in reply to a signal generated by throwing a coin into the slot and then therefrom to the dispensing mouth of the machine.

Each of the foodstuff packs should be fed from the cooling zone to the heating zone and then to the dispensing zone reliably and promptly as far as possible, for the foodstuff purchaser having thrown his coin into the machine would wait anxiously for the heated foodstuff to appear out of the machine. Meanwhile the lid of the electronic range mush be electronically closely sealed during its operation in view of protection of human body from radiation of harmful microwave.

It is thus an object of the invention to provide such feeding device of simple and compact construction with satisfying the requirements just referred to above, which can be attained fundamentally by mechanically interrelating the operations of feeding the foodstuff pack into, heating it in and discharging it from the electronic range chamber with the reciprocative and translational movement of the microwave sheltering lid of the electronic oven. More specifically said device essentially comprises a carrier box fixed at the back thereof to the electronic range lid and being adapted to be reciprocatingly moved between the retracted position for receiving the foodstuff pack falling down from the above and for pushing the heated foodstuff pack therefrom down to a chute for the dispensing mouth, and the forward position for heating the packed foodstuff contained in said carrier box in the electronic oven with the lid closed.

Figure 3:
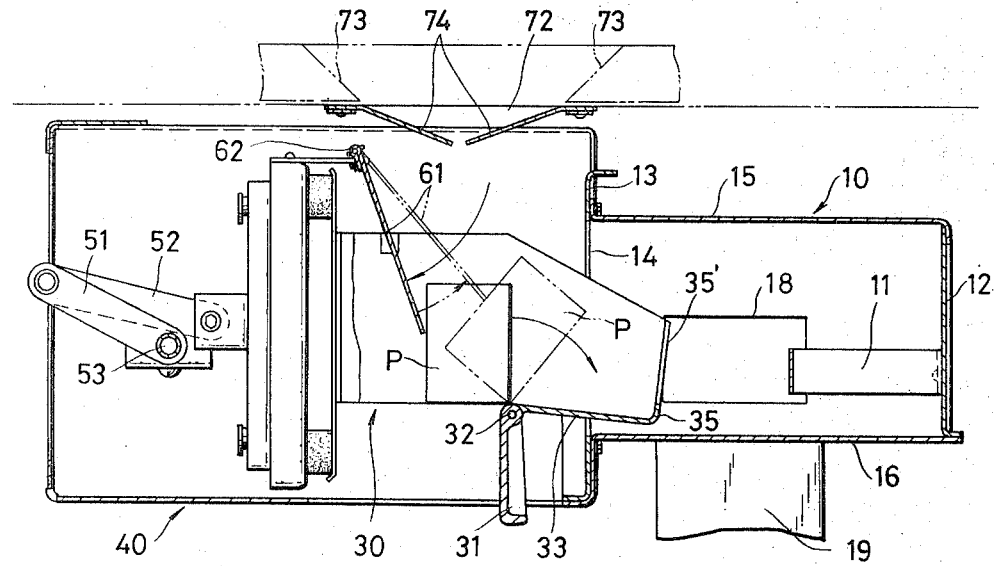
Figure 4:
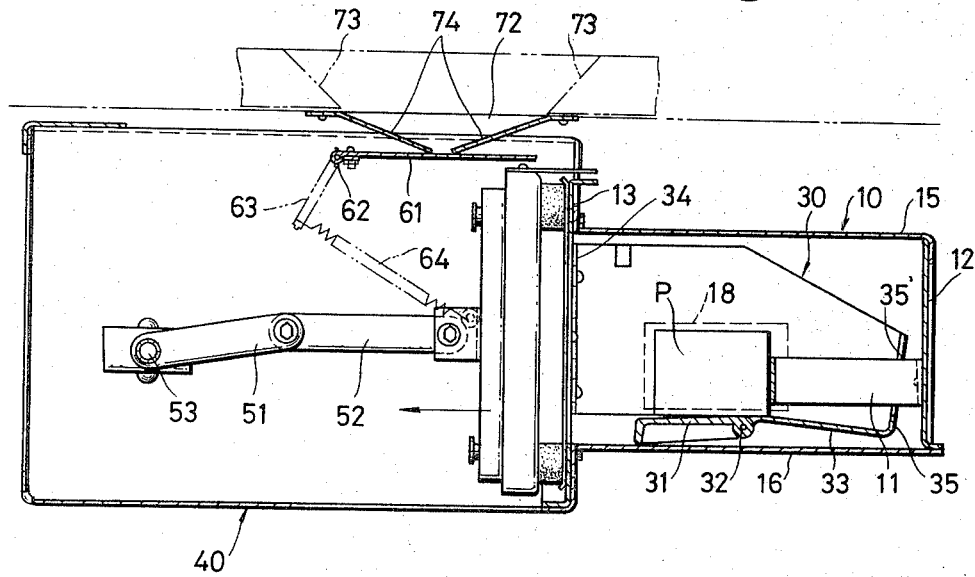
Figure 5:
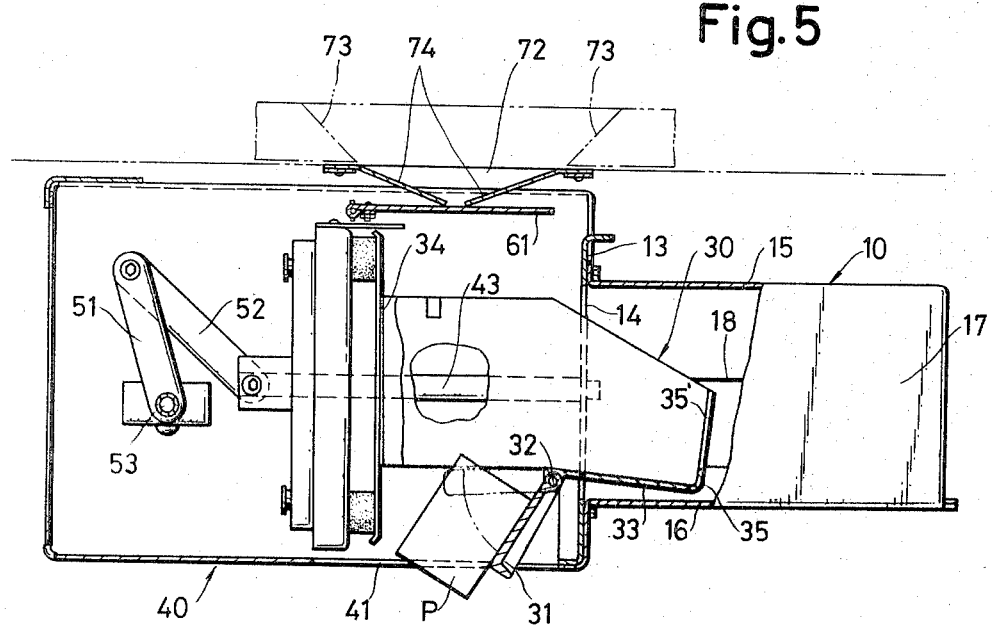

The other objects and advantages of the invention would be appreciated by studying the explanation to be made hereinafter with respect to a preferred embodiment in reference to the accompanying drawing, in which;

FIGS. 1-A to 1-D are sketches of the carrier box fixed with the lid and of the electric range chamber in section for showing various positions of movable parts thereof relative to the movement of the foodstuff pack, FIG. 2 is a top plan view of the device according to the invention and the electronic range which is now in operation and sealed with the lid, FIG. 3 is a section taken along the line III — III in FIG. 2, for showing the retracted position in which the carrier box is receiving the foodstuff pack having fallen down from the above, FIG. 4 is a similar section but showing the forward position corresponding to that in FIG. 2 in which the carrier box has been translationally moved into the electronic range chamber for heating the packed foodstuff therein and the lid is completely closed, and FIG. 5 is a similar section but showing the nearly retracted position in which the heated foodstuff pack is being thrown down at the open bottom wall out of the carrier box.

In the first place, essential constructional feature of the invention and operation thereof shall be explained in reference to FIGS. 1-A to 1-D. A chamber generally represented by 10 is provided with a magnetron not shown so as to generate microwave for heating a foodstuff pack P to be located at a predetermined position therein. Said heater chamber 10 has six electronically insulator walls and only one of said walls has an open window which is shown at the left side in the drawing which may be closed with an electronically insulator lid represented generally by 20. Said lid 20 is fixed with a carrier box represented generally by 30 at the back end wall thereof. Said carrier box 30 is open at the top and has a hinged bottom wall 31. The assembly of said lid 20 and said carrier box 30 is adapted to be reciprocally and translationally moved between the retracted and forward positions by means of an electric motor M of which output shaft is connected via gearings not shown with one end of a link 51 of which other end is pivoted with one end of a second link 51 of which other end is pivotally connected with said lid 20. The forward end wall of said carrier box 30 has a hole formed therein and said chamber 20 has a projection member 11 provided at the wall inner surface so that when the carrier box 30 is moved toward its forward position the free end of said projection member 11 may enter the carrier box 30 through said hole for the purpose to be referred to hereinafter.

FIG. 1-A shows the position for the carrier box 30 to receive the foodstuff pack P which is not always necessarily but preferably of substantially cubic form. There is provided a hinged plate 61 above the movable carrier box 30 to occupy said position. Said plate 61 is urged by means of a spring not shown so as to usually take its horizontal position. When the pack P has been moved from the storage zone to lie on said plate 61 in reply to a signal generated for instance by throwing the coin into the slot of the machine, said plate 61 is yieldingly angularly moved due to the increased gravity so that the pack P may fall into the carrier box 30. The motor M is energized, for instance by closing of a microswitch not shown and having detected the angular movement in the clockwise direction in the drawing of said plate 61, to be driven for pushing the assembly of the lid 20 and of the carrier box 30 toward the electronic range chamber 10. Said forward movement of the assembly would forcingly angularly move the hinged plate 61 abutting on the lid 20 in the counterclockwise direction in the drawing. If the pack P is cube more or less long in one direction and dropped onto the bottom wall of the carrier box 30 in the upright position as shown in FIG. 1-A, the hinged plate 61 being angularly moved to its usual horizontal position would push the pack P upset as shown in FIG. 1-B. Of course this upset movement of the pack P is not always necessary. Depending on the form of the pack P, it would be pushed merely forward but without changing its posture. This movement of the pack P caused by the angular movement of the hinged plate 61 is not always necessary but preferable as the pretreatment for correctly positioning the pack P in the carrier box 30 to be dropped out thereof without fail when the hinged bottom wall 31 is opened and in the electronic oven 10 to be suitably heated. Further driving of the motor M brings the carrier box 30 to its forward position as shown in FIG. 1-C, in which the lid 20 completely closes the open window of the electronic range chamber 10. The projection member 11 transeversely inwardly mounted in the chamber 10 as referred to above would abut on the pack P contained in the carrier box 30 being approaching thereto at the tip end so as to correctly position the pack P to lie on the hinged bottom wall 31 in the carrier box 30. The electronic range is to be energized for commencing heating and inoperated after the lapse of a predetermined time period respectively synchronizedly by any means well known to those skilled in the art, on which no further explanation shall be given more. Further driving of the motor M would pull the carrier box 30 out of the chamber 10 to be in the retracted position as shown in FIG. 1-D. Now the hinged bottom wall 31 is out of support by the bottom wall of the chamber 10 so as to be angularly moved in the counterclockwise direction in the drawing due to the gravity of itself and of the pack P which falls out of the carrier box 30. Further driving of the motor M would push the assembly of the lid 20 and of the carrier box 30 a little toward the electronic range chamber 10 so as to return the hinged bottom wall 31 to its initial or usual horizontal position as shown in FIG. 1-A in which the carrier box 30 is ready for receiving a new foodstuff pack P to fall down thereinto.

Now a preferred embodiment of the invention shall be explained in more detail and definitiveness in reference to FIGS. 2 to 5. The heater chamber represented generally by 10 has the projection member 11 mounted in the inner surface of a right end wall 12 so as to horizontally project toward an opposite left end wall 13 which has an open window 14 for allowing the carrier box 30 to completely enter the chamber 10. said chamber 10 further has a top wall 15, a bottom wall 16 and side walls 17, 17, one of which side walls has an open window 18 through which a magnetron 19 is adapted to radiate microwave into the chamber 10 for the heating.

A casing represented generally by 40 is arranged face to face with said electronic range chamber 10 at the left end wall 13 thereof so that the both chambers communicate through said open window 14. Said casing 40 has an open window 41 formed in the bottom wall thereof for discharging the foodstuff pack P down to the chute not shown. A pair of guide bars 42, 42 are arranged longitudinally in the casing 40 and parallelly with each other, as best shown in FIGS. 2 and 5, for reciprocally and longitudinally moving the assembly of said lid 20 and of said carrier box 30. For that purpose there are provided two sleeves 43, 43 respectively fitted on each of said bars 42, 42 for sliding therealong and respectively fixed to the back surface of the lid 20. To each of said sleeves 43, 43 is pivoted one end of a link 52, the other end of which is pivotally connected with one end of another link 51. In the casing 40 there is transversely arranged a shaft 53, on which the other end of each of said links is fixedly mounted. One end of said shaft 52 is mechanically connected through gearings 54 with a motor 55 so as to reciprocally and longitudinally move the lid 30 and consequently the carrier box 30 connected therewith.

The carrier box 30 has the angularly movable bottom wall 31 which is hinged 32 at the inner edge of a bottom wall 33 closing substantially half of the bottom area of said box 30 at the right side in the drawing, as best shown in FIGS. 3 to 5. Said hinged bottom wall 31 is so arranged that when it is out of support by the bottom wall 16 of the heating chamber 10 which is to be caused by moving of said carrier box 30 from its forward position as shown in FIGS. 2 and 4 to the retracted one of FIGS. 3 or 5, said hinged bottom wall 31 may angularly moved in the counterclockwise direction as best shown in FIG. 5, for the purpose referred to above. Said box 30 further has a back end wall 34, a front end wall 35 and side walls 36. Said back end wall 34 is fixed to the lid by any suitable means such as bolt-nut. As occasion demands said back end wall 34 may be omitted so that this side of the carrier box 30 is defined by the lid 20 itself. The front end wall 35 has an open window 35' for allowing the projection member 11 to access in the carrier box 30 therethrough for the purpose referred to above. The top of the box 30 is open for receiving the foodstuff pack P falling down from the above.

There is provided a chute 72 for dropping the pack P down into the carrier box 30 when it occupies the retracted position of FIG. 3. Said chute 72 is preferably defined by a slope surface 73 and usually closed by a pair of elastic material sheet members 74, 74 of which each root edge is fixed so that when the pack P is moved onto said sheet members 74 the free end portion of each of said sheet members would be yieldingly bent down to allow dropping of the pack P.

Just below said elastic sheet members 74, 74 there is provided the hinged plate member 61 already referred to in respect to FIGS. 1-A to 1-D of which root edge is fixedly amounted on a transversely extending bar 62 as best shown in FIG. 2. In order to keep said hinged plate 61 usually in its horizontal position, one end of said bar 62 is bent 63 of which tip end is pulled by extending a coiled spring 64 of which other end is fixed to the casing best shown in FIGS. 2 and 4. Cooperation of said elastic sheet members 74 and this hinged plate member 61 would ensure stable falling of the foodstuff pack P onto the bottom wall 31 of the carrier box 30.

As referred to in the explanation in reference to FIGS. 1-A to 1-D and as best shown in FIG. 3 illustrating the embodiment, it is an additional or rather main role for the hinged plate 61 to move the pack P upset or merely slidingly forward as pretreatment for the correct positioning by the projection member 11. For that purpose, the lid 20 is provided with a tongue 21 fixed with the root thereof at the upper end face of said lid 20 so that the free end of said tongue 21 may abut on said hinged plate 61 to be forcingly angularly moved in the counterclockwise direction during the forward movement of the assembly of the lid 20 and of the carrier box 30, as best shown in FIG. 3.

There would be no necessity of making explanation again on the operation of the arrangement illustrated above. It is pointed out only that FIG. 3 illustrates the most retracted position in which the carrier box 30 is ready for receiving the foodstuff pack P falling down. In this position the hinged bottom wall 31 is open but the falling pack P is moved forward to lie on the fixed bottom wall 33 with aid of the angularly moving plate 61. When the packed foodstuff P has been heated in FIG. 4, the shaft 53 is rotated in the counterclockwise direction in the drawing to pull the lid 20 and consequently the carrier box 30 out of the heating chamber 20 to occupy the position of FIG. 5 in which the bottom wall 31 is open to drop the pack P down. After that the shaft 52 is rotated in the reverse direction as shown by the arrow in FIG. 3 to push the lid 20 and the carrier box 30 having received the pack P toward the heating chamber 20. In FIGS. 1-A to 1-D, it is noted that the motor M is driven always in the same direction, namely in the clockwise direction and that the last figure illustrates the most retracted position in which the bottom wall 31 is open for dropping the pack P down but the first figure shows the carrier box 30 having been slightly moved forward so that the bottom wall 31 is closed in which condition the pack P is to be received. Such is a matter of design to be selected as occasion demands.

In addition thereto various changes and modifications are possible without departing the spirit and scope of the invention. It is noted that the above illustration in reference to the drawing has been given not for the purpose of limiting the invention thereto but only for explaining the invention.

What is claimed is:

1. A heating and dispensing device for heating and dispensing an article of food comprising means defining a heating chamber having an opening, a carrier box open at the top and adopted to receive said article of food, means reciprocably mounting said carrier box between an inserted position in which the carrier box with said article of food therein is disposed within said heating chamber and a retracted position in which said carrier box is at least partially withdrawn from said heating chamber, said carrier box having a lid which closes said opening in said heating chamber when said carrier box is in said inserted position, operable means disposed above said open top carrier box, said operable means being operable to shift said article of food in said carrier box upon movement of the latter from its retracted to its inserted position, and means defining a pivotal bottom wall on said carrier box, said pivotal bottom wall being pivotal between a first article-supporting position which occurs when said carrier box is in said heating chamber and a second position angularly disposed relative to first position such as to permit said heated article to fall by gravity from said carrier box when the latter is moved from its inserted to its retracted position.

2. A heating and dispensing device according to claim 1 including a positioning means disposed in said heating chamber and adopted to engage said article of food when the carrier box is moved from its retracted to its inserted position to position said article food in a predetermined position on said pivotal bottom wall when said carrier box is in said inserted position.

3. A heating and dispensing device according to claim 2 wherein said positioning means is a projection member having a free end which contacts said article of food when said carrier box is moved from said retracted to said inserted position.

4. A heating and dispensing device according to claim 1 wherein said heating chamber has a bottom wall means, said pivotal bottom wall of said carrier box being supported in said first position by said bottom wall means of said heating chamber when said carrier box is in said inserted position, said pivotal bottom wall of said carrier box being disposed and arranged relative to said bottom wall means of said heating chamber such that said pivotal bottom wall pivots by the force of gravity from said first position to said second position when said carrier box is moved from its inserted to its retracted position.

5. A heating and dispensing device for heating and dispensing an article of food comprising means defining a heating chamber having an opening, a carrier box open at the top and adopted to receive said article of food, means reciprocably mounting said carrier box between an inserted position in which the carrier box with said article of food therein is disposed within said heating chamber and a retracted position in which said carrier box is at least partially withdrawn from said heating chamber, said carrier box having a lid which closes said opening in said heating chamber when said carrier box is in said inserted position, operable means disposed above said open top carrier box, said operable means being operable to shift said article of food in said carrier box upon movement of the latter from its retracted to its inserted position, means defining a pivotal bottom wall on said carrier box, and a positioning means disposed in said heating chamber and adopted to engage said article of food when the carrier box is moved from its retracted to its inserted position to position said article of food in a predetermined position on said pivotal bottom wall when said carrier box is in said inserted position, said pivotal bottom wall being pivotal between a first article-supporting position which occurs when said carrier box is in said heating chamber and a second position angularly disposed relative to first position such as to permit said heated article to fall by gravity from said carrier box when the latter is moved from its inserted to its retracted position.

6. A heating and dispensing device according to claim 5 wherein said operable means comprises a pivotally mounted plate disposed above the open top of said carrier box when the latter is in its retracted position, biasing means biasing said plate to a generally horizontal position, said plate being pivotal from its generally horizontal position to an open position by the weight of an article of food being admitted into said carrier box, said plate being disposed and arranged relative to said carrier box such that upon movement of the latter from its retracted to its inserted position, said carrier box engages said plate to pivot the latter from its open to its generally horizontal position.

7. A heating and dispensing device according to claim 6 wherein said plate is disposed and arranged to extend into said carrier box when said plate is in said open position to engage said article of food when the latter has been deposited in said carrier box, whereby upon subsequent movement of said plate from its open position toward its generally horizontal position, said plate engages said article of food to shift the latter within said carrier box.

8. A heating and dispensing device according to claim 7 wherein said plate is dimensioned such that the tip of said plate engages said article of food to effect said shifting of the latter.

9. A heating and dispensing device according to claim 8 including means supporting said plate for pivotal movement about a fixed axis.

10. A heating and dispensing device according to claim 6 including a casing disposed adjacent to said opening in said heating chamber, said carrier box being disposed in said casing for receiving an article of food when said carrier box is in said retracted position, said plate being pivotally mounted on said casing.

* * * * *